3,017,345
TREATMENT OF HYDROCARBONS
Du Bois Eastman, Whittier, and Warren G. Schlinger,
 Pasadena, Calif., assignors to Texaco Inc., New York,
 N.Y., a corporation of Delaware
No Drawing. Filed July 12, 1960, Ser. No. 42,198
16 Claims. (Cl. 208—210)

This invention relates to the treatment of hydrocarbons. More particularly it is concerned with the desulfurization of liquid hydrocarbons.

It is known to desulfurize hydrocarbons by passing the hydrocarbon over a desulfurization catalyst in the presence of hydrogen at elevated temperatures and pressures. By this treatment the sulfur in sulfur containing compounds such as mercaptans and thiophenes is converted to hydrogen sulfide which is easily removed from the reaction product. Although known catalytic hydrodesulfurization methods are, in general, satisfactory for the treatment of relatively light fractions, these known methods have not been found completely satisfactory for the desulfurization of high sulfur oils.

It has now been found that hydrocarbons, particularly high sulfur oils can be effectively desulfurized in a two-stage process. According to the process of the present invention, the material to be desulfurized is mixed with hydrogen and the mixture passed through a first reaction zone under highly turbulent flow conditions and the reaction product is then contacted with a desulfurization catalyst in the presence of hydrogen in a second reaction zone.

The effectiveness of the two-stage process of the present invention does not lie in that desulfurization takes place in both stages. Actually, in the first stage of the process of the present invention, little, if any, desulfurization takes place. Apparently in the hydrogenation reaction of the first stage the sulfur compounds are converted into a form which makes the sulfur more easily converted to hydrogen sulfide by the second stage catalytic treatment.

Any hydrocarbon fraction ranging from naphtha to reduced crudes may be desulfurized by the process of the present invention. However, the process is particularly adapted to the treatment of high sulfur heavy oils such as residual oils, shale oil, tar sand oil, San Ardo crude, Santa Maria crude and the like or mixtures thereof.

Hydrogen from any suitable source may be used in the process of the present invention. Catalytic reformer off gas, manufactured gas such as electrolytic hydrogen or hydrogen produced by partial combustion, advantageously of either a portion of the feed or a portion of the product, mixtures of hydrogen and oxides of carbon such as synthesis gas may be used as the hydrogenating gas. The hydrogenating gas need not necessarily be free from hydrogen sulfide. Several percent of hydrogen sulfide can be tolerated in the recycle hydrogen stream.

In the first stage of the process of the present invention the hydrocarbon is passed through a tubular reactor in the presence of hydrogen under conditions of highly turbulent flow. Reaction times may range from 1 second to 2 hours but reaction times of 5 to 300 seconds are preferred. Temperatures of 900 to 1500° F., preferably between about 900 and 1100° F. may be employed. Superatmospheric pressures ranging from 1000 to 20,000 p.s.i.g. and higher may be used although pressures of 1400 to 10,000 p.s.i.g. are preferred. Hydrogen rates may range from 4000 to 100,000 standard cubic feet per barrel of slurry feed, rates of 5000 to 50,000 standard cubic feet per barrel of feed being preferred.

For the hydrogenation to be effective the reaction mixture must be maintained, during the reaction, under conditions of high turbulence. The hydrocarbon feed rate, hydrogen recycle rate, reaction coil diameter and operating conditions of temperature and pressure all tend to affect the velocity of flow and the turbulence. It has been found convenient to express turbulence in terms of the ratio of the average apparent viscosity of the flowing stream, $\bar{\epsilon}_m$, to the molecular or kinematic viscosity $\nu$, viz.

$$\frac{\bar{\epsilon}_m}{\nu}$$

Hereinafter, we shall refer to this ratio $$\frac{\bar{\epsilon}_m}{\nu}$$

as turbulence level. The apparent viscosity of the flowing stream, $\epsilon_m$, equals the sum of the eddy viscosity, $\epsilon_m$, and the kinematic viscosity $\nu$ which may be shown in the expression $\epsilon_m = \epsilon_m + \nu$. Under conditions of turbulence, $\epsilon_m$ has a finite value and it is apparent that if the magnitude of the apparent viscosity exceeds the kinematic viscosity at the point in question, that the ratio of $$\frac{\bar{\epsilon}_m}{\nu}$$

exceeds unity. For a given turbulent system, it follows that the average value of the ratio, as expressed by $$\frac{\bar{\epsilon}_m}{\nu}$$

exceeds unity. The average apparent viscosity, $\bar{\epsilon}_m$ as employed herein is defined by the equation $$\bar{\epsilon}_m = \frac{1}{r_0}\int_0^{r_0} \epsilon_m dr$$

where $r_0$ is the radius of the conduit. By substitution and integration, employing the parameters described by Corcoran et al., Industrial and Engineering Chemistry 44, 410 (1952), this expression $$\bar{\epsilon}_m = \frac{1}{r_0}\int_0^{r_0} \epsilon_m dr$$

may be rewritten $$\bar{\epsilon}_m = \frac{r_0}{15}\sqrt{\frac{r_0 g}{2\sigma}\cdot\frac{dp}{dx}}$$

The latter equation is in terms which may be readily determined for a given system; $r_0$ being the conduit radius; $\sigma$ the specific weight of the flowing fluid; $g$ the acceleration of gravity and $$\frac{dp}{dx}$$

the pressure drop per unit of conduit length. In the process of this invention, turbulence levels of 25 and higher may be employed but turbulence levels of 50 to 1000 are preferable. At turbulence levels below 25, a heavy tar-like material is formed at the expense of the more desirable products. This tar-like material also causes fouling and plugging of the apparatus requiring frequent shut-downs.

In the foregoing paragraph, the various symbols used in the formulas are defined as follows:

$d$ = differential
$g$ = acceleration of gravity, feet per second $^2$
$p$ = pressure, pounds per square foot
$r$ = radial distance from center of conduit, feet
$r_0$ = radius of conduit, feet $x$ = distance, feet
$\epsilon_m$ = eddy viscosity, square feet per second
$e_m$ = apparent viscosity, square feet per second
$\bar{e}_m$ = average apparent viscosity, square feet per second
$\nu$ = kinematic viscosity, square feet per second
$\sigma$ = specific weight, pounds per cubic foot The entire reaction product of the first reaction zone or a selected portion thereof is subjected to catalytic hydrodesulfurization in the second reaction zone. If, for example, the feed to the first reaction zone is a naphtha, the entire reaction product or even the entire effluent of the first reaction zone may be sent to the second reaction zone. If, however, the feed to the first reaction zone is a heavy material such as a crude petroleum, the effluent from the first reaction zone may be introduced into a separator and all of the effluent boiling above a predetermined level may be sent to the second stage reaction zone. For example, the separator may be so operated that only naphtha and lighter materials are sent to the second reaction zone or diesel fuel and lighter materials are sent to the second reaction zone. If desired, additional hydrogen may be added to the feed to the second reaction zone.

Catalysts which may be used in the second reaction zone include platinum, palladium, nickel and compounds, particularly the oxides or sulfides of nickel, cobalt, molybdenum and tungsten and mixtures thereof. Particularly suitable catalysts are the mixtures of molybdenum and cobalt or nickel oxides or sulfides and mixtures of nickel and tungsten sulfides. The catalytic materials are preferably supported on a carrier such as an inorganic oxide including silica, alumina, magnesia, zirconia, mixtures thereof such as magnesia silica, alumina silica and the like. The preferred catalysts for the second stage reaction are nickel tungsten sulfide and cobalt molybdate composited with alumina.

The temperature of the second stage reaction zone may vary from about 400 to about 1000° F. and pressure from atmospheric to about 2000 p.s.i.g. The preferred conditions are temperatures of 600 to 850° F. and pressure of 500 to 1000 p.s.i.g. Space velocities may range from 0.5 to 20 volumes of feed per volume of catalyst per hour, the heavier high sulfur oils being treated at the lower space velocities. Hydrogen recycle rates may range from as low as 4000 to as much as 50,000 standard cubic feet per barrel of feed.

The invention may be better understood from the following example which is given for illustrative purposes only.

A heavy vacuum gas oil having an API gravity of 22° and a total sulfur content of 1.94 weight percent is passed through a reactor containing a cobalt molybdate on alumina catalyst at a temperature of 725° F., a pressure of 750 p.s.i.g., a space velocity of 3 v./v./hr. and a hydrogen rate of 5000 s.c.f./bbl. The liquid product has a total sulfur content of 0.39 weight percent.

The same feed stock as used above is passed through a tubular coil at a temperature of 900° F., a pressure of 3500 p.s.i.g., a turbulence level of 116 and a hydrogen rate of 5000 standard cubic feet per barrel. A sample of the liquid product shows a total sulfur content of 1.90 weight percent. The entire effluent from the first reaction zone is passed through a second reaction zone under the same conditions described above for the single stage desulfurization process, i.e. a temperature of 725° F., a pressure of 750 p.s.i.g., and a space velocity of 3 v./v./hr. The liquid product from the second reaction zone has a total sulfur content of 0.070 weight percent.

The example shows the increased effectiveness of the two-stage process of the present invention. Although the first-stage hydrogenation treatment effects little, if any, desulfurization of the feed stock, it renders the second stage catalytic desulfurization much more effective. The single stage catalytic treatment effects an 80% reduction in the sulfur content. When the same feed stock is subjected to the preliminary hydrogenation, the same catalytic treatment then effects a reduction of 96.3% in the sulfur content.

Various other modifications will be obvious to those skilled in the art without departing from the spirit and scope of the invention and therefore only such limitations should be imposed as are indicated in the appended claims.

This application is a continuation-in-part of our copending application Serial No. 765,318, filed October 6, 1958.

We claim:

1. A process for the production of a hydrocarbon fraction of reduced sulfur content which comprises passing a mixture of a sulfur-containing normally liquid hydrocarbon fraction and hydrogen through a first reaction zone at a temperature between about 850 and 1500° F., a pressure between 1000 and 20,000 p.s.i.g. and under conditions of highly turbulent flow, said mixture containing between 4000 and 100,000 cu. ft. of hydrogenating gas per bbl. of liquid hydrocarbon, and contacting at least a portion of the reaction product in a second reaction zone with a desulfurization catalyst at a temperature between 500 and 1000° F. and a pressure between atmospheric and 2000 p.s.i.g. in the presence of hydrogen.

2. The process of claim 1 in which the turbulence level is at least 25.

3. The process of claim 1 in which the turbulence level is between 50 and 1000.

4. A process for the production of a hydrocarbon fraction of reduced sulfur content which comprises passing a mixture of a sulfur-containing normally liquid hydrocarbon fraction and hydrogen through a first reaction zone at a temperature between about 850 and 1500° F., a pressure between 1000 and 20,000 p.s.i.g. and at a turbulence level of at least 25, said mixture containing between 4000 and 100,000 cu. ft. of hydrogenating gas per bbl. of liquid hydrocarbon and contacting at least a portion of the reaction product in a second reaction zone with a desulfurization catalyst comprising the sulfides of nickel and tungsten at a temperature between 500 and 1000° F. and a pressure between atmospheric and 2000 p.s.i.g. in the presence of hydrogen.

5. A process for the production of a hydrocarbon fraction of reduced sulfur content which comprises passing a mixture of a sulfur-containing normally liquid hydrocarbon fraction and hydrogen through a first reaction zone at a temperature between about 850 and 1500° F., a pressure between 1000 and 20,000 p.s.i.g. and at a turbulence level of at least 25, said mixture containing between 4000 and 100,000 cu. ft. of hydrogenating gas per bbl. of liquid hydrocarbon and contacting at least a portion of the reaction product in a second reaction zone with a desulfurization catalyst comprising compounds of molybdenum and a group VIII metal at a temperature between 500 and 1000° F. and a pressure between atmospheric and 2000 p.s.i.g. in the presence of hydrogen.

6. The process of claim 5 in which the group VIII metal is nickel.

7. The process of claim 5 in which the group VIII metal is cobalt.

8. A process for the production of a hydrocarbon fraction of reduced sulfur content which comprises passing a mixture of a sulfur-containing normally liquid hydrocarbon fraction and hydrogen through a first reaction zone at a temperature between about 850 and 1500° F., a pressure between 1000 and 20,000 p.s.i.g. and a turbulence level of at least 25, said mixture containing between 4000 and 100,000 cu. ft. of hydrogenating gas per bbl. of liquid hydrocarbon and contacting at least a portion of the reaction product in a second reaction zone with a desulfurization catalyst comprising the oxides of molybdenum and a group VIII metal at a temperature between 500 and 1000° F. and a pressure between atmospheric and 2000 p.s.i.g. in the presence of hydrogen.

9. The process of claim 8 in which the group VIII metal is nickel.

10. The process of claim 8 in which the group VIII metal is cobalt.

11. A process for the production of a hydrocarbon fraction of reduced sulfur content which comprises passing a mixture of a sulfur-containing normally liquid hydrocarbon fraction and hydrogen through a first reaction zone at a temperature between 900 and 1100° F., a pressure between 1400 and 2000 p.s.i.g. and at a turbulence level of at least 25, said mixture containing between 5000 and 50,000 cu. ft. of hydrogenating gas per bbl. of liquid hydrocarbon and contacting at least a portion of the reaction product in a second reaction zone with a desulfurization catalyst at a temperature between 500 and 1000° F. and a pressure between atmospheric and 2000 p.s.i.g. in the presence of hydrogen.

12. The process of claim 11 in which the turbulence level is between 50 and 1000.

13. The process of claim 11 in which the desulfurization catalyst comprises the sulfides of molybdenum and a group VIII metal.

14. The process of claim 11 in which the desulfurization catalyst comprises the oxides of molybdenum and a group VIII metal.

15. The process of claim 14 in which the group VIII metal is nickel.

16. The process of claim 14 in which the group VIII metal is cobalt.

References Cited in the file of this patent

UNITED STATES PATENTS

| | | |
|---|---|---|
| 1,954,993 | Gohr | Apr. 17, 1934 |
| 2,116,061 | Dorrer | May 3, 1938 |
| 2,381,522 | Stewart | Aug. 7, 1945 |
| 2,769,758 | Porter et al. | Nov. 16, 1956 |
| 2,853,433 | Keith | Sept. 23, 1958 |
| 2,888,393 | Ballard et al. | May 26, 1959 |